United States Patent
Brosse et al.

(10) Patent No.: US 10,293,566 B2
(45) Date of Patent: May 21, 2019

(54) MULTI-LAYER TABLET WITH RECESS, DEVICE AND METHOD FOR COMPACTING SUCH A TABLET

(71) Applicant: EUROTAB, St Just St Rambert (FR)

(72) Inventors: Jacques Brosse, La Grand Croix (FR); Valerie Venet, Orlienas (FR); Jean-Louis Espeit, Saint Etienne (FR); David Malartre, Aurec sur Loire (FR)

(73) Assignee: EUROTAB, St Just St Rambert (FR)

( * ) Notice: Subject to any disclaimer, the term of this patent is extended or adjusted under 35 U.S.C. 154(b) by 163 days.

(21) Appl. No.: 15/313,838

(22) PCT Filed: May 27, 2015

(86) PCT No.: PCT/EP2015/061727
§ 371 (c)(1),
(2) Date: Nov. 23, 2016

(87) PCT Pub. No.: WO2015/181241
PCT Pub. Date: Dec. 3, 2015

(65) Prior Publication Data
US 2017/0197375 A1    Jul. 13, 2017

(30) Foreign Application Priority Data
May 28, 2014   (FR) ..................... 14 54819

(51) Int. Cl.
*B29C 43/36* (2006.01)
*B30B 11/08* (2006.01)
(Continued)

(52) U.S. Cl.
CPC ............ *B30B 11/085* (2013.01); *B30B 11/08* (2013.01); *B30B 15/065* (2013.01); *C11D 17/0078* (2013.01); *B29C 2043/3626* (2013.01)

(58) Field of Classification Search
None
See application file for complete search history.

(56) References Cited

U.S. PATENT DOCUMENTS

| | | |
|---|---|---|
| 3,840,631 A | 10/1974 | Alexander |
| 6,361,306 B1 | 3/2002 | Hinzpeter et al. |

(Continued)

FOREIGN PATENT DOCUMENTS

| | | |
|---|---|---|
| DE | 10064639 A1 | 7/2002 |
| EP | 0842762 A2 | 5/1998 |

(Continued)

OTHER PUBLICATIONS

French Search Report with English Language Translation Cover Sheet, dated Feb. 6, 2015, French Application No. 1454819.

(Continued)

*Primary Examiner* — Mary Lynn F Theisen
(74) *Attorney, Agent, or Firm* — Womble Bond Dickinson (US) LLP

(57) ABSTRACT

The invention relates to a press device for manufacturing compacted tablets from at least one mixture in powder form, comprising at least one compaction assembly comprising a lower punch (3) and an upper punch (4) each having an active compaction surface and placed on either side of a die, in which the lower punch has a longitudinal recess open on the side of the die, inside of which is mounted a central rod which is translatably mobile relative to the lower punch, characterized in that the central rod is coupled to the lower punch by means of a resilient link provided so as to hold, in an inoperative position, the central rod in a maximum deployed position in which the central rod protrudes relative to the active surface of the lower punch. The invention also relates to a specific compaction method and to a multi-layer compacted tablet with a recess.

10 Claims, 6 Drawing Sheets

(51) Int. Cl.
    *B30B 15/06* (2006.01)
    *C11D 17/00* (2006.01)

(56) References Cited

U.S. PATENT DOCUMENTS

| | | | |
|---|---|---|---|
| 2001/0006265 A1* | 7/2001 | Kouda | B30B 11/08 264/109 |
| 2003/0167819 A1* | 9/2003 | Olsson | B21J 5/12 72/407 |
| 2004/0247728 A1* | 12/2004 | Ozeki | A61J 3/10 425/354 |
| 2005/0112202 A1* | 5/2005 | Lerner | A61J 3/005 424/470 |
| 2015/0021806 A1* | 1/2015 | Mancini | B30B 11/027 264/113 |
| 2016/0324787 A1* | 11/2016 | Saur-Brosch | B30B 11/34 |

FOREIGN PATENT DOCUMENTS

| | | |
|---|---|---|
| EP | 0979862 A1 | 2/2000 |
| EP | 1179042 | 11/2000 |
| EP | 1244767 B1 | 12/2000 |
| EP | 1440790 A1 | 8/2002 |
| EP | 1107862 B1 | 12/2002 |
| EP | 1135457 B1 | 8/2004 |
| EP | 1082406 B1 | 8/2005 |
| EP | 1280656 B1 | 7/2006 |
| ES | 2415741 A1 | 7/2013 |
| WO | WO-0009646 A1 | 2/2000 |
| WO | WO-0010800 A1 | 3/2000 |
| WO | WO-0070008 A1 | 11/2000 |
| WO | WO-0112767 A1 | 2/2001 |
| WO | WO-0149815 A2 | 7/2001 |
| WO | WO-0185437 A1 | 11/2001 |
| WO | WO-0198448 A1 | 12/2001 |
| WO | WO-2005123984 A1 | 12/2005 |
| WO | WO-2006048606 A1 | 5/2006 |
| WO | WO-2009071311 A1 | 6/2009 |

OTHER PUBLICATIONS

International Search Report with English Language Translation, dated Jul. 29, 2015, PCT Application No. PCT/EP2015/061727.

* cited by examiner

FIG. 5A
FIG. 5B
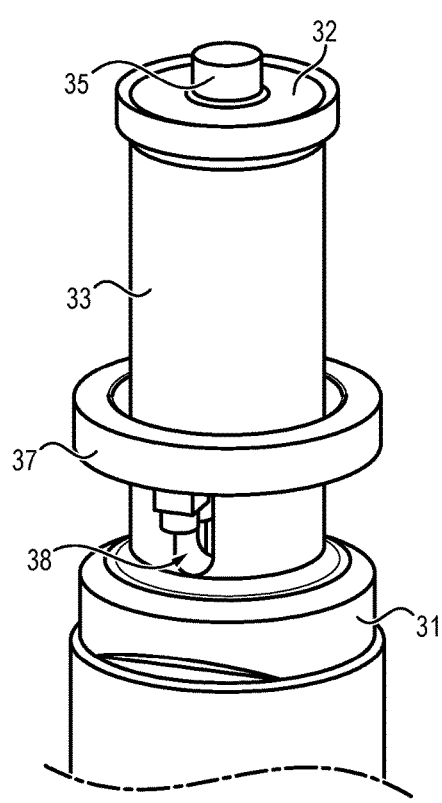
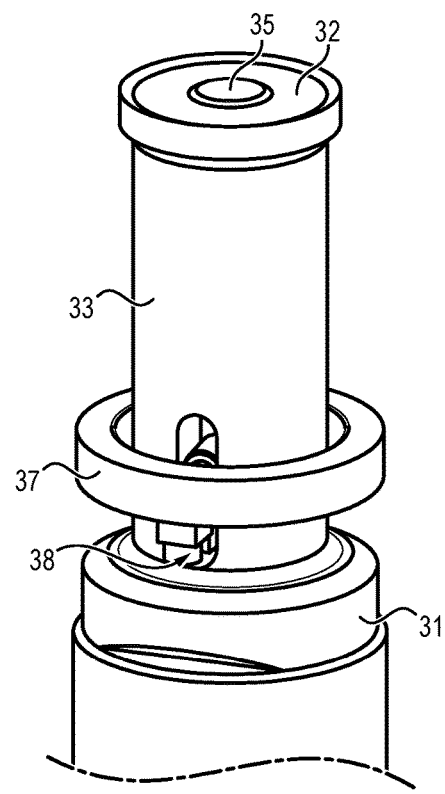

MULTI-LAYER TABLET WITH RECESS, DEVICE AND METHOD FOR COMPACTING SUCH A TABLET

FIELD OF THE INVENTION

The present invention relates to multilayer tablets having a cavity, and to a rotary press to form such a tablet and associated production method. The proposed invention can be useful for example in the field of the production of disinfectant tablets e.g. to purify water, or detergent tablets intended to be used in appliances of dishwasher or washing machine type for the cleaning of eating utensil or laundry elements respectively.

STATE OF THE ART

Detergent tablets are most often prepared by mixing various components together, preferably in powder or granule form, but also in liquid form. This mixture is then compacted using a press to form a tablet. Nonetheless in detergent tablets some components ill withstand compression, others may react before use and thereby reduce the efficacy of the tablet at the time of use, this being the reason why multilayer tablets have been developed such as described in patent application EP0979862. Multilayer tablets allow separation of ingredients likely to react and at the same time allow compression-sensitive ingredients to be compressed only once by inserting them in the last layer for example. Multilayer tablets may have slightly deferred disintegration times between the different layers, the first layer having been compressed several times generally having a longer disintegration time than the following less compressed layers.

Other formats of tablets have also been developed such as so-called "tab on tab" tablets formed of a conventional monolayer or multilayer tablet on which a portion of tablet is positioned e.g. in the form of a semi-sphere. The "tab on tab" format allows separation of incompatible compounds in the different layers whilst improving the appearance of the tablets. With this tablet format, it is also possible to obtain sequenced disintegration of the different tablet phases. Such tablets and associated production methods are described for example in the documents WO01/98448, WO01/49815, EP1179042 and EP1244767.

Application WO2006/048606 describes a method of producing a multilayer tablet having a cavity intended to receive an insert such as a bead, the cavity being formed using a compaction method by stamping. More specifically, in a rotary press with punches for example, compaction by stamping provides for an upper punch comprising an active compacting surface having a profile with a projecting portion for the purpose of forming the cavity in the different compacted layers. With such a compacting method, the areas below and in the vicinity of the sides of the cavity are compressed to a much larger extent than the remainder of the tablet which creates density heterogeneities within the tablet. Such density heterogeneities result in the different areas of one layer having different disintegration and solubilisation profiles, this also acting on the mechanical strength of the tablets.

To overcome these disadvantages, it was proposed in application WO00/10800 to use a press device in which the lower and upper punches each comprise a ring-shaped part and a central part able to move independently of one another. Such a press device allows the forming of multilayer tablets in which one of the layers is ring-shaped, whilst the layer immediately adjacent to this ring-shaped layer covers the latter and even fully fills the central cavity of the ring-shaped layer. Such a tablet has the advantages of having relatively homogeneous mechanical properties, in particular in terms of density, and is visually close to an insert tablet of "tab on tab" type, this being of some commercial interest. However, the proposed production method is complex to implement since it particularly requires independent controlling of the different parts forming the lower and upper punches. In addition, the tablets formed using such a method have a certain number of disadvantages in terms of disintegration in particular. Application EP1440790 also describes a press device of this type, allowing the production of tablets of most diverse shapes, but the layout and functioning of the device are very complex.

Another method was described in application WO01/85437 and proposes simplifying the previously described method using a conventional upper punch and a lower punch comprising a ring-shaped portion able to be moved in translation, and a central coaxial element inside the ring-shaped portion of the lower punch, the central element being held during the entire compaction cycle, in particular during actual compression, in a determined fixed position where said central element is in the die underneath the upper surface of the die. The described method allows the forming of tablets having a cavity without the central rod being moved during the different steps of the compacting cycle. The tablets produced with such a method may comprise several layers, one of the end layers comprising a blind cavity inside which an insert of "tab on tab" type may be inserted for example. The tablets thus formed have the advantage of relatively homogeneous mechanical properties in particular in terms of density, and allow true tablets of "tab on tab" type to be produced. However, the functional properties of said tablets still remain to be improved, in particular in terms of disintegration.

It is therefore one goal of the invention to propose a compacted multilayer tablet with cavity which does not have the above-mentioned shortcomings.

In particular, it is one goal of the invention to propose a compacted multilayer tablet with cavity which has increased functional properties, in particular in terms of disintegration.

It is also a goal of the invention to propose a compacted multilayer tablet with cavity which has improved mechanical properties, having homogeneous density distribution for example, and having mechanical strength allowing good tablet handling and storage.

Another goal of the invention is to propose a rotary press with improved punches, allowing the forming of compacted multilayer tablets with cavity in simple manner and on an industrial scale.

A further goal of the invention is to propose a rotary punch press having specific functional elements that can easily be adapted to a conventional rotary punch press.

A further goal of the present invention is to propose a method of producing a compacted multilayer tablet with cavity that is easy to produce, in particular not requiring any specific control or command differing from a method of producing a compacted multilayer tablet not having a cavity.

DESCRIPTION OF THE INVENTION

For this purpose, a press device is proposed to produce compacted tablets from at least one mixture in powder form, comprising:

a rotary table in which is arranged at least one die intended to receive the mixture, at least one compaction assembly comprising a lower punch and an upper punch each having an active surface for compaction, said lower and upper punches being arranged on either side of the table with their respective active surface facing the die, and being mounted movable in translation coaxially to the die and following the rotating movement of the table, wherein the lower punch comprises a longitudinal cavity open on the side of the die, inside which a central rod is mounted movable in translation with respect to the lower punch along an axis of translation, characterized in that the central rod is coupled to the lower punch via a resilient link provided along the translation axis of the central rod to hold, in the rest position, the central rod in a deployed position in which the central rod projects with respect to the active surface of the lower punch.

This deployed position preferably corresponds to the maximum deployed position i.e. the abutting position of the central rod with respect to its translational movement outwardly from the lower punch.

Preferred but non-limiting aspects of this device, taken alone or in combination, are the following:
  the upper punch has a planar or curved solid active surface,
  the central rod is integral with the lower punch so that, if no stress is applied to the central rod, said central rod remains in a fixed position with respect to the lower punch when said lower punch is moved,
  the resilient link has a spring constant provided so that the central rod moves towards inside the longitudinal cavity of the lower punch subsequent to stress applied by the upper punch when said upper punch is moved close to the lower punch,
  the resilient link has a sufficient spring constant so that the central rod remains at least partly projecting from the active surface of the lower punch when the upper punch is moved close to the lower punch,
  the resilient link has a spring constant of between 0.1 daN/mm and 10 daN/mm, preferably between 0.2 daN/mm and 4 daN/mm, more preferably between 0.5 daN/mm and 3 daN/mm, and further preferably between 1 daN/mm and 2.5 daN/mm.
  the device comprises a resilient link member inserted between the central rod and the lower punch to form the resilient link, the resilient link member preferably being selected from among a spring, a resilient compression rod or a pneumatic cylinder,
  the device comprises an actuating member fixedly mounted on the central rod and extending radially with respect to said central rod, said actuating member projecting laterally from the lower punch through a groove arranged in said lower punch, said actuating member being provided to abut against the die so as to position the central rod in a retracted position in which the central rod does not project from the active surface of the lower punch.

There is also proposed a method of producing a compacted multilayer tablet with cavity using such a press device.

In particular, a method is proposed of producing a compacted tablet having at least two layers using a press device such as presented, comprising the following successive steps:
  E1. Taking a first mixture in powder form and placing said first mixture in an open space formed by the lower punch and the die, so as to cover the active surface of said lower punch and the central rod projecting from said active surface;
  E2. Moving the upper punch close to the lower punch so as to apply a compaction stress on the first mixture to form a first compacted layer, said compaction stress further allowing movement of the central rod towards inside the longitudinal cavity;
  E3. Moving the upper punch away from the lower punch so as to remove the compaction stress on the first mixture so that the central rod returns to its deployed position with respect to the lower punch, the central rod thereby piercing the first layer so as to form a through cavity;
  E4. Taking a second mixture in powder form and placing said second mixture in the open space formed by the lower punch and the die, so as to cover the first layer;
  E5. Moving the upper punch close to the lower punch so as to apply a compaction stress on the second mixture and the first layer to form a second compacted layer on the first layer;
  E6. Moving the upper punch away from the lower punch so as to remove the compaction stress on the compacted assembly formed by the first and second layers;
  E7. Ejecting the compacted assembly out of the die by translation of the lower punch so that the active surface of said lower punch lies flush with the surface of the rotary table, the compacted assembly thus ejected forming the compacted tablet.

Preferred but non-limiting aspects of this method, taken alone or in combination, are the following:
  at the ejection step E7, the movement of the lower punch in the direction of the die allows movement of the central rod to a retracted position in which the central rod does not project from the active surface of the lower punch;
  before the ejection step E7, the successive steps E4, E5 and E6 are reiterated as many times as it is desired to add additional layers to the compacted assembly;
  before the ejection step E7, an additional compacting step is performed by moving the upper punch close to the lower punch so as to apply an additional compaction stress to the compacted assembly.

Finally, a compacted multilayer tablet is proposed wherein each layer is formed from a mixture in powder form, comprising:
  a first layer with a through cavity along a longitudinal axis orthogonal to the first layer; and
  at least one second layer directly formed on the first layer;
characterized in that the second layer fills less than 70% of the volume of the cavity of the first layer.

By construction, the first layer is the only pierced layer of the tablet.

Preferred but non-limiting aspects of this tablet, taken alone or in combination, are the following:
  the second layer has a surface flush with the surface of the first layer without the second layer extending into the cavity of the first layer;
  in the tablet, the percentage compaction of the mixture of compacted powder at the cavity differs from the percentage compaction of the whole multilayer tablet by less than 5%, preferably less than 3%, and more preferably less than 1%.
  the different layers are formed from powder mixtures for detergent or disinfectant action.

DESCRIPTION OF THE FIGURES

Other characteristics and advantages of the invention will become further apparent from the following description that is solely illustrative and non-limiting and is to be read in connection with the appended drawings in which:

FIGS. 5a and 5b are perspective views of the lower punch in FIGS. 4a and 4b, in deployed position and retracted position respectively;

Figure 7A:
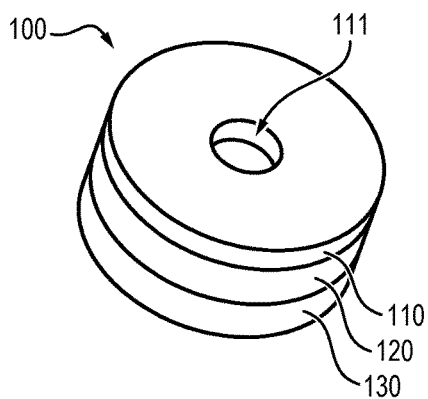
Figure 7B:
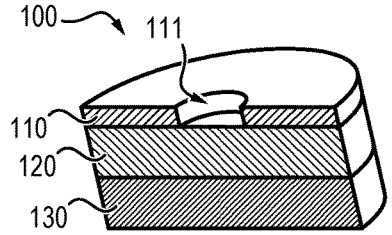

The series of FIG. 6, from FIGS. 6a to 6l, illustrate the different steps of the compacting cycle to form a compacted multilayer tablet with cavity according to the invention;

FIG. 7a is a perspective view of a compacted multilayer tablet with cavity according to the invention;

FIG. 7b is a perspective, cross-sectional view of the tablet illustrated in FIG. 7a.

DETAILED DESCRIPTION OF THE INVENTION

Figure 2:
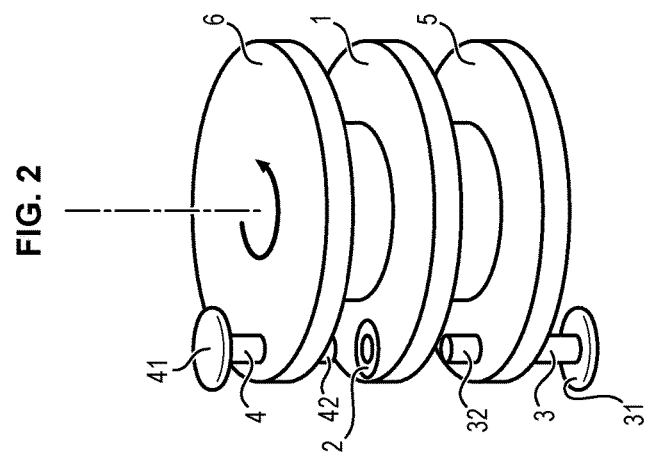
FIG. 2 is a schematic illustrating the driving in rotation of the punches in the rotary press device.
Figure 1:
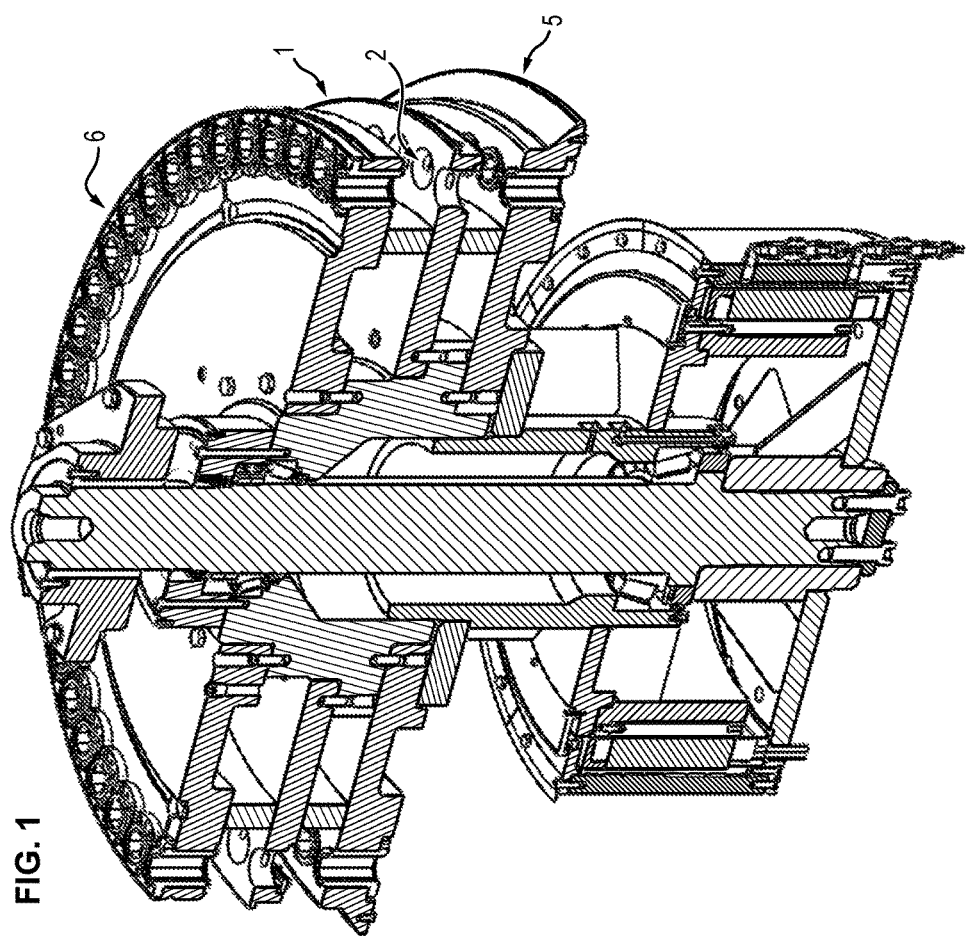
FIG. 1 is a three-dimensional, cross-sectional illustration of a rotary press device.

FIG. 1 is a perspective cross-section of a rotary press device allowing illustration of the structure conventionally used to drive the compacting punches in rotating movement.

The rotary press device comprises a turret that is set in rotation by a known motorisation system via a drive shaft that is generally central. The turret comprises a central table 1 which comprises at least one compacting die 2, this die 2 being intended to receive a mixture of compounds in powder form from which it is desired to form a compacted tablet of determined volume.

The central table preferably comprises a plurality of dies 2, for example distributed around the periphery of the central table 1 which is of substantially circular shape. Said dies 2 are of general cylindrical shape and are either formed by a through hole directly arranged on the periphery of the central table 1, or each die is a specific part comprising a central cylindrical through opening of circular section and of determined diameter corresponding to the desired diameter of the tablet, this part acting as die having an external shape adapted to be inserted in the through openings arranged on the periphery of the central table 1.

The press device further comprises compaction assemblies each formed of a pair of punches (not illustrated in FIG. 1), namely a lower punch and an upper punch that are arranged either side each of the dies 2 of the central table 1. Preferably, the device comprises a pair of lower 3 and upper 4 punches for each of the dies 2 of the device. The lower 3 and upper 4 punches are mounted in the press so that they can be moved axially with respect to the corresponding die 2, so that said lower 3 and upper 4 punches can be inserted in the die 2 to compress the powder mixture placed inside the die to form a tablet of determined volume.

The lower 3 and upper 4 punches are also mounted in the press so as to have a circular movement corresponding to the circular movement of the die 2 with which they are associated. One solution to set the punches in movement along this circular trajectory is to use driving plates 5 and 6 located either side of the central table 1, these two driving plates 5 and 6 being integral with the central table 1 and therefore also being mounted in rotation in the press. The driving plates 5 and 6 are provided with through openings disposed on their periphery, these through openings being intended to receive the lower 3 and upper 4 punches respectively. The lower 3 and upper 4 punches are therefore driven in rotation by the driving plates 5 and 6 respectively, in synchronised fashion with the corresponding die 2, the lower 3 and upper 4 punches also being able to slide in the openings provided on the periphery of the driving plates 5 and 6 so that the active compacting surfaces 32 and 42 at the compacting end of the lower 3 and upper 4 punches respectively are able to be inserted in the die 2.

The axial movement of the lower 3 and upper 4 punches is controlled by lower control means and upper control means respectively, these lower and upper control means being intended to cooperate with the guiding ends 31 and 41 of the lower 3 and upper 4 punches respectively. The purpose of the control means is to move the corresponding punches along the axis of the die so as to modify the axial position of the punch (and more particularly the axial position of the compacting end of the punch) as a function of the press operating cycle. The axial position of a punch is defined as the position of the punch in the axis of the die, this position thereby allowing characterization of the axial movement of the punch but also the associated confinement volume.

The lower and upper control means comprise all known elements allowing the movement of the upper and lower punches, such as cam tracks and/or compacting rollers. These different elements are selected and assembled according to the specifically required compacting cycle to form the desired tablet.

As illustrated in FIGS. 3a, 3b, 4a, 4b, 5a and 5b, the proposed press device has the particularity of comprising a lower punch 3 with a main body 33 comprising a longitudinal cavity 34 open on the side of the die 2 on the side of the active surface 32. A central rod 35 is mounted inside this longitudinal cavity 34 so that it is movable in translation with respect to the lower punch 3. The sliding central rod 35 is also called a sliding finger.

Figure 3B:
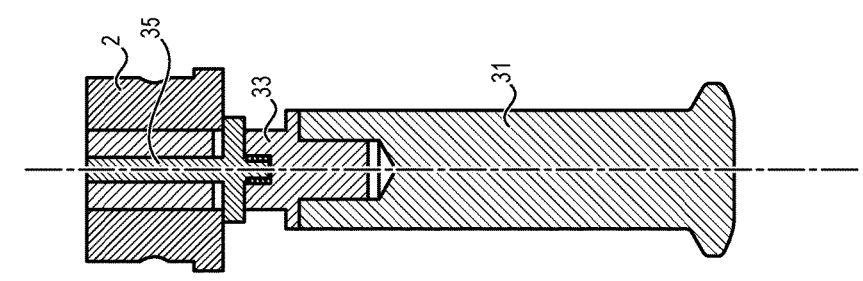
FIGS. 3a and 3b are cross-sectional views of the lower punch of the invention, in deployed position and in retracted position respectively.
Figure 3A:
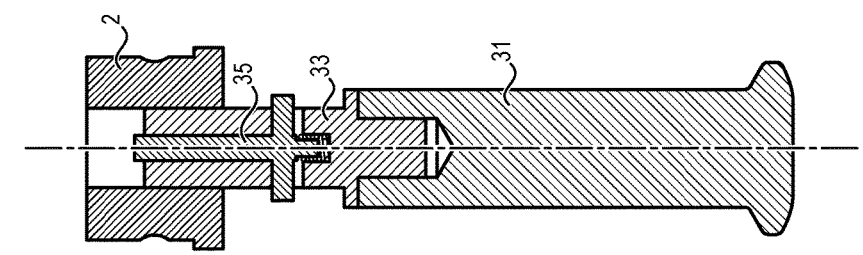

As illustrated in FIGS. 3a and 3b, the main body 33 of the lower punch 3 is generally mounted on a punch holder forming the guiding end 31 of said lower punch 3.

The central rod 35 is advantageously coupled to the lower punch 3 via a resilient link 36 provided along the axis of translation of the central rod 35 in the longitudinal cavity 34.

Figure 4A:
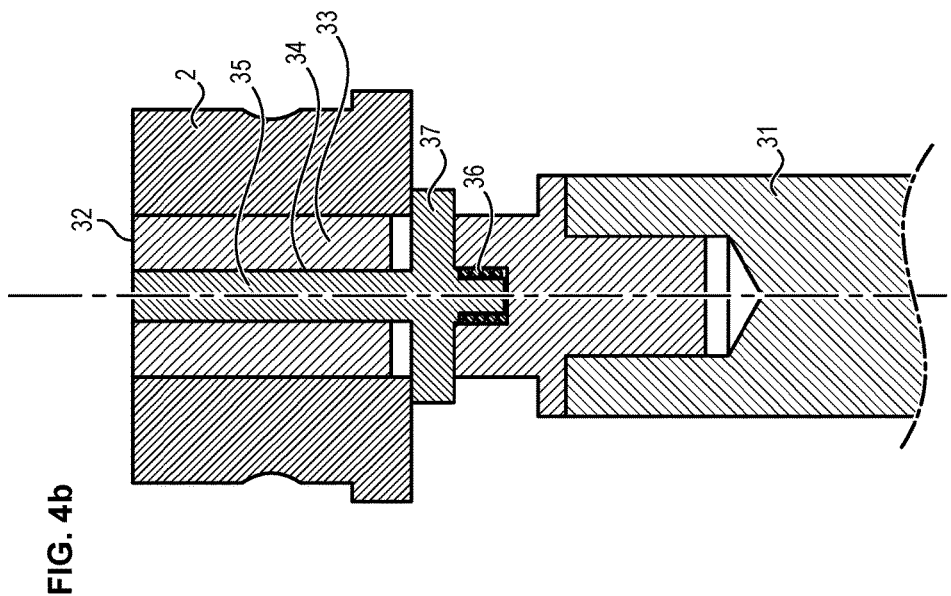
FIGS. 4a and 4b are detailed cross-sectional views of the lower punch in FIGS. 3a and 3b, in deployed position and retracted position respectively.
Figure 4B:
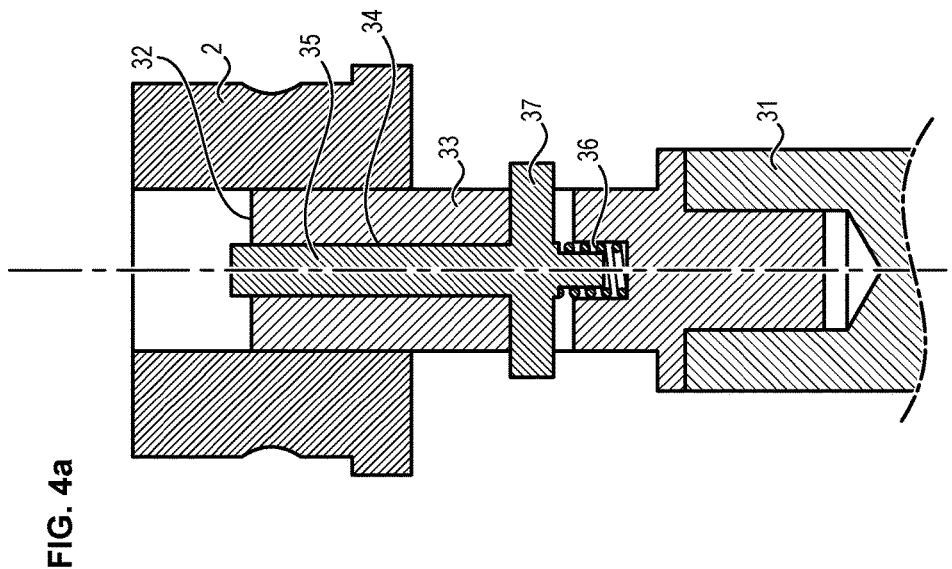

The resilient link 36 is provided to hold in the rest position the central rod 35 in deployed position in which the central rod 35 projects from the active surface 32 of the lower punch 3. As illustrated in FIGS. 3a, 4a, and 5a, this deployed position is the maximum deployed position i.e. the central rod 35 is unable to slide further outwardly from the body of the lower punch 3. The arrangement of the central rod 35 is provided for example such that this central rod abuts an internal wall of the body 33 of the lower punch 3 thereby limiting its outward translation and hence defining the maximum deployed position.

The central rod 35 is preferably integral with the lower punch 3 so that when no stress is applied to the central rod 35, said central rod 35 remains in a fixed position with respect to the lower punch 3 when said lower punch 3 is moved.

Therefore, unless a specific stress is applied to the central rod 35, the movements of said central rod 35 remain highly dependent on movements of the body 33 of the lower punch 3.

Preferably, the central rod has passive movement i.e. it is the movement of other parts of the press device which drive the movement of the central rod 35, in particular movement of the lower punch 3 and/or upper punch 4.

The proposed specific arrangement allows the central rod 35 to be moved and optionally to have its position modified with respect to the body 33 of the lower punch 3, without any direct actuating of said central rod 35. It is chiefly the movement of the upper punch 4 with respect to the lower punch 3 which allows movement of the central rod 35 with respect to the body 33 of the lower punch 3. It is to be noted that the upper punch 4 may be of conventional shape, in particular with a simple active surface i.e. without cavity or projection, but on the contrary having a solid surface. Therefore, the upper punch 4 has a planar active surface or a curved surface if it is desired that the outer surface of the tablet should be curved, but in all cases the surface is solid.

The movement of the central rod 35 with respect to the body 33 of the punch 3 is dependent on the resilient link 36 between these parts.

The resilient link 36 may be formed for example of a resilient link member 36 inserted between the central rod 35 and the lower punch 3.

Such a resilient link member 36 may be a spring for example as illustrated in the different Figures. This spring is preferably a compressive spring extending from one end of the central rod 35 in the longitudinal cavity 34 and bearing upon an inner wall of the body 33 of the lower punch 3.

However, the resilient link member could be any other element ensuring the required function for the resilient link. For example, the use could be envisaged of a resilient compression rod. A pneumatic cylinder could also be used.

According to one preferred embodiment, the resilient link is ensured through the use of Belleville washers. Belleville washers are discs with a specific shape that ensure a spring function.

Preferably, the resilient link 36 has a spring constant provided so that the central rod 35 moves inwardly into the longitudinal cavity 34 of the lower punch 3 subsequent to stress applied by the upper punch 4 when said upper punch 4 is moved close to the lower punch 3.

As will be seen below, one of the objectives is to produce a multilayer tablet having a cavity, and more specifically a multilayer tablet in which one of the end layers has a through cavity so that it is possible to access the immediately adjacent layer via this through cavity.

When the upper punch 4 is moved close to the lower punch 3, the compacted powder mixture forms a compacted layer having a blind cavity, this cavity corresponding to the volume of the central rod 35 projecting from the active surface 32 of the lower punch 3. The fact that the central rod 35 partly retracts when a certain compaction stress is applied means that this same central rod 35 will be deployed on release of the compaction stress so that it comes to pierce the film closing the blind cavity to create a through cavity.

More preferably, the resilient link 36 has a sufficient spring constant for the central rod 35 to remain at least partly projecting from the active surface 32 of the lower punch 3 when the upper punch 4 is moved close to the lower punch 3.

The fact that the central rod 35 is able to remain at least partly protruding from the active surface 32 of the lower punch 3 guarantees that the cavity formed in the first compacted layer is never fully filled. In particular, when the powder mixture intended to form the adjacent layer is compacted, this mixture can partly fill the cavity of the first layer, in particular if a high compaction stress is applied.

Further preferably, the resilient link has a spring constant of between 0.1 daN/mm and 10 daN/mm, preferably between 0.2 daN/mm and 4 daN/mm, more preferably between 0.5 daN/mm and 3 daN/mm, and further preferably between 1 daN/mm and 2.5 daN/mm.

The selected spring constant may be a function of the applied compaction force. Therefore, preferably, a resilient link is chosen adapted for a compaction force of between 10 kN and 500 kN, preferably between 20 kN and 200 kN, and more preferably between 30 kN and 150 kN.

As indicated above, and as will be seen more precisely from the description of the compaction method below, the central rod 35 has axial movement inside the longitudinal cavity 34 which is dependent upon the compaction stress applied to the powder mixture to be compacted, this compaction stress being dependent upon the relative position of the lower 3 and upper 4 punches.

In some phases of the compacting cycle, and in particular when the formed compacted tablet is ejected, it is preferable that the central rod 35 should be in retracted position in which it does not project from the active surface 32 of the lower punch 3 i.e. the central rod 35 is fully inside the longitudinal cavity 34.

This makes it possible for the compacted tablet to be removed very easily from the rotary table 1 of the press e.g. via sweeping to push the tablet radially out of the rotary table 1.

For this purpose, the lower punch 3 preferably comprises an actuating member 37 fixedly mounted on the central rod 35 and extending radially from said central rod 35.

This actuating member 37 projects laterally from the body 33 of the lower punch 3 through a groove 38 arranged inside the lower punch 3.

The actuating member 37 may be ring-shaped for example, surrounding the body 33 of the lower punch 3.

This actuating member 37 is provided to come and abut the die 2 when the lower punch 3 is moved in the direction of said die 2. Once the actuating member 37 is in abutment, the movement of the lower punch 3 in the direction of the die 2 tends to cause the central rod 35 to enter the longitudinal cavity 34 until it is positioned in the retracted position in which the central rod 35 no longer projects from the active surface 32 of the lower punch 3.

One of the advantages of the device presented above is that it is adaptable to any standard rotary press i.e. any press having conventional upper and lower punches with a solid body and active surface mounted at the end of the body.

It suffices to replace the lower punch of a standard rotary press with the lower punch presented above, to form a press device allowing the production of tablets having complex shapes, in particular multilayered and with cavity as described below. Most advantageously, the presented lower punch is able in particular to cooperate with any type of upper punch, it simply being necessary to adapt the stiffness of the resilient link on which depends the movement of the central rod.

FIGS. 6a to 6l illustrate a method of producing a compacted multilayer tablet with cavity using a press device such as presented above.

At step E1, a first mixture in powder form is first taken that is intended to compose the first layer 110 of the tablet 100 provided with a cavity 111.

The upper punch 4 is brought to raised position. The lower punch 3 is brought to bottom position with the central rod 35 in maximum deployed position under the action of the resilient link 36.

Figure 6A:
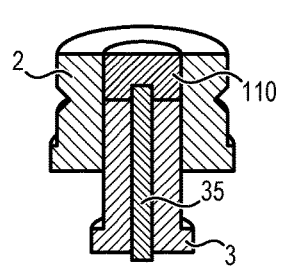

As illustrated in FIG. 6a, the first mixture is then placed in the open space formed by the lower punch 3 and the die 2 so as to cover the active surface 32 of said lower punch 3 and the central rod 35 projecting from said active surface 32. For example, the powder fills the entirety of the cavity formed by the die 2 and the lower punch 3.

Figure 6B:
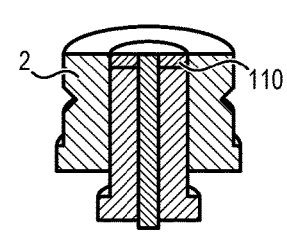

FIG. 6b illustrates the dosage of the first mixture to maintain the exact amount required for compaction of the first layer. The upper punch 4 is still in top position and the lower punch 3 rises into the die 2 so as to maintain only the desired amount of first powder mixture.

Preferably, the height of powder to be compacted substantially corresponds to the height of the projecting portion of the central rod 5 protruding from the active surface 32 of the punch 3. More preferably, a thin layer of powder of between 0.05 mm and 1 mm covers the central rod itself.

Figure 6C:
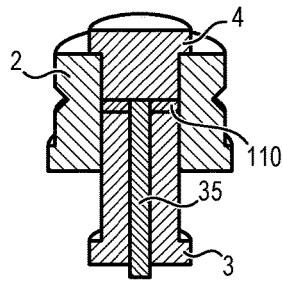

At the following step E2, such as illustrated in FIG. 6c, the first powder mixture is compacted. For this purpose, the upper punch 4 is moved close to the lower punch 3 so as to apply a compaction stress on the first mixture to form a first compacted layer, said compaction stress further allowing movement of the central rod 35 towards the inside of the longitudinal cavity 34. The compacted layer thus formed has a blind cavity such as described above, this blind cavity corresponding to the volume of the central rod 35 remaining projecting from the active surface 32 of the lower punch 3.

Figure 6D:
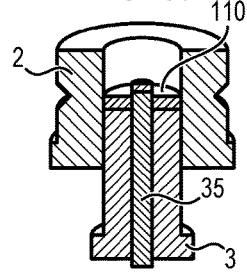

At the following step E3, such as illustrated in FIG. 6d, the upper punch 4 is moved away from the lower punch 3 to remove the compaction stress on the first mixture and so that the central rod 35 returns to its deployed position with respect to the lower punch 3 under the action of the resilient link 36. The central rod 35 therefore pierces the first layer thereby forming a through cavity in the place of the blind cavity formed at the preceding step.

Next, the second compacted layer is formed on this first pierced layer. A second mixture in powder form is therefore taken at step E4, intended to compose the second layer 120 of the tablet 100.

Figure 6E:
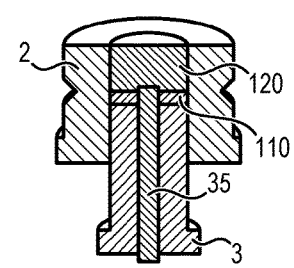

As illustrated in FIG. 6e, the second mixture is placed in the open space formed by the lower punch 3 and the die 2, so as to cover the first compacted layer.

Figure 6F:
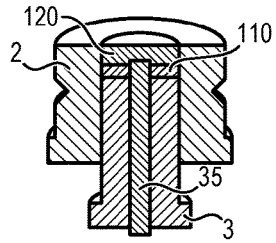
Figure 6G:
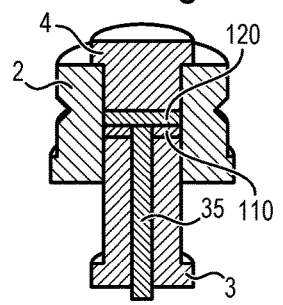

FIG. 6f illustrates the dosage of the second mixture to maintain the exact amount desired for compaction of the second layer. The upper punch 4 is still in raised position and the lower punch 3 moves up into the die 2 so as only to hold the desired amount of second powder mixture.

At the following step E5, such as illustrated in FIG. 6f, the second powder mixture is compacted on the first compacted layer. For this purpose, the upper punch 4 is moved towards the lower punch 3 to apply a compaction stress on the second mixture and the first layer to form a second compacted layer on the first layer.

Under the compaction stress, and as a function of the spring constant of the resilient link 36, the central rod 35 can be moved towards inside the longitudinal cavity 34. If the central rod 35 moves beyond the contact surface between the first compacted layer and the second powder mixture, then the second compacted powder mixture will partly fill the through cavity 111 of the first compacted layer 110.

At the following step E6, the upper punch 4 is moved away from the lower punch 3 to remove the compaction stress on the compacted assembly formed by the first and second layers.

If it is desired to form a tablet with cavity having only two layers, it is possible at step E7 to eject the compacted assembly from the die 2 via translation of the lower punch 3. Before this ejection, an additional compaction stress is applied to the two-layer compacted assembly thus formed to reinforce the cohesion of the assembly and thereby finalize compaction of the compacted product.

If it is desired to form a tablet with cavity having more than two layers, the successive steps E4, E5 and E6 are repeated as many times as there are desired additional layers on the compacted assembly.

Therefore, as illustrated in FIGS. 6h to 6k, a third layer 130 can be formed on the two-layer compacted assembly. To do so a third mixture in powder form is collected that is intended to form the third layer 130 of the tablet 100.

Figure 6H:
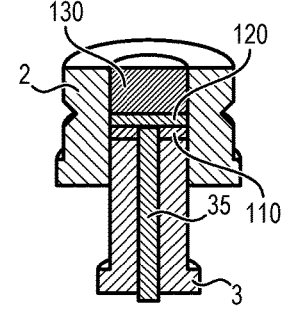

As illustrated in FIG. 6h, the third mixture is placed in the open space formed by the lower punch 3 and the die 2 to cover the second compacted layer.

Figure 6I:
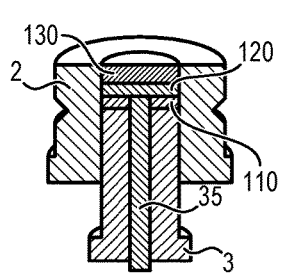

FIG. 6i illustrates the dosage of the third mixture so as to maintain the exact amount desired for compaction of the third layer. The upper punch 4 is still in raised position and the lower punch 3 moves up into the die 2 so as only to hold the desired amount of third powder mixture.

Figure 6J:
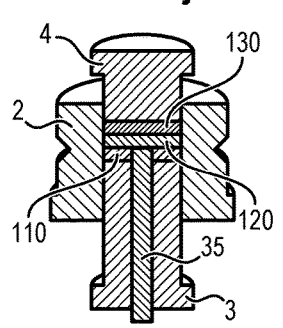

At the following step illustrated in FIG. 6j, the third powder mixture is compacted on the two-layer compacted assembly. To do so the upper punch 4 is moved towards the lower punch 3 to apply a compaction stress on the third mixture and the two-layer compacted assembly to form a third compacted layer on the two-layer compacted assembly.

Figure 6K:
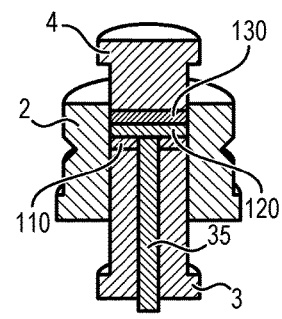

To finalize compaction, an additional compaction stress is applied to the three-layer compacted assembly to reinforce the cohesion of the assembly. Therefore, as illustrated in FIG. 6k, in addition to downward movement of the upper punch 4 the lower punch 3 can also be moved upwards increasing the compaction stress.

The upper punch 4 is then moved away from the lower punch 3 to remove the compaction stress on the three-layer compacted assembly, and to release the die 2.

Figure 6L:
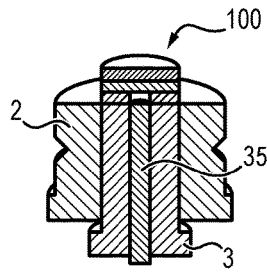

At previously described step E7, illustrated now in FIG. 6l, the three-layer compacted assembly is ejected out of the die 2 by translation of the lower punch 3. The lower punch 3 is raised so that the active surface 32 of said lower punch 3 comes to lie flush with the surface of the rotary table. The ejected compacted assembly forms the desired compacted tablet.

Preferably, the movement of the lower punch 3 in the direction of the die 2 at the ejection step E7, allows movement of the central rod 35 to a retracted position in which the central rod 35 does not project from the active surface of the lower punch 3. This facilitates the ejection step of the formed, compacted tablet. It is achieved for example by means of an adapted actuating member 37 integral with the central rod 35, as described above in detail.

The above-described specific rotary press and method allow the production of multilayer tablets wherein the different layers have a particular arrangement allowing advantageous mechanical but also functional properties to be imparted to the compacted tablet.

In this manner compacted multilayer tablets are produced wherein each layer is formed from a mixture in powder form, comprising a first layer having a specific form with a through cavity along its longitudinal axis and at least one second layer formed directly on the first layer and having a form similar in dimension to the first layer.

The first layer can also be called the pierced layer of the tablet. As will be seen below, this first layer is the only layer having a through orifice formed by means of the specific arrangement of the central rod in the lower punch.

One specificity of the formed tablet is that the second layer fills less than 70% of the volume of the cavity of the first layer. Since the second layer is not pierced, the cavity of the first layer is uniformly and progressively filled starting from the contact surface between the first and second layer. The volume of the cavity of the first layer that is not filled with the constituent material of the second layer is therefore located on the side of the free surface of the first layer.

Preferably, the second layer fills less than 50% of the volume of the cavity of the first layer, preferably less than 30% of the volume of the cavity of the first layer, further preferably less than 20% of the volume of the cavity of the first layer and even less than 10% of the volume of the cavity of the first layer.

According to another preferred embodiment, the second layer has a surface flush with the surface of the first layer without the second layer extending into the cavity of the first layer. The second layer therefore does not at all enter the inside of the through cavity of the first layer.

FIGS. 7a and 7b a particular embodiment of a compacted three-layer tablet 100 such as produced for example with the above-described method, comprising a first layer 110 pierced with a through cavity 111, associated with a second layer 120 and a third layer 130 on the second layer 120.

According to this embodiment, the second layer 120 lies flush with the through cavity 111 without the powder of the second mixture entering into the through cavity 111.

The fact that the through cavity 111 of the first layer 110 is mostly free of composition forming the second layer 120 results in the imparting of specific properties to the tablet that are particularly advantageous and will become more clearly apparent from the tests described below.

In particular, such an arrangement can guarantee good disintegration of the different layers. The disintegration of the second layer 120 is promoted in particular by the fact that the contact with the solution is made not only on the peripheral edges but also inside the through cavity 111. In addition, since the second layer 120 has little or no extension inside this through cavity 110, the disintegration of the first layer 110 is not perturbed.

In all configurations, as follows from the production method described above, and as follows also from the Figures, the second layer and the optional other additional layers do not have a through cavity. They are non-pierced layers contrary to the first layer.

The fact that only the first layer is pierced and that the other layer or layers are non-pierced allows a tablet to be produced having sufficient strength for handling and storage of the tablet, whilst being of complex design with the possibility in particular of seeing the second layer through the through cavity of the first layer which is pierced.

The general shape of the compacted multilayer tablet, and hence of the different constituent layers thereof, can be diverse according to needs of use e.g. of octagonal, rectangular, oval, circular or other cross-section. Preferably, the compacted tablet is of circular cross-section and hence of general cylindrical shape.

Similarly, the cavity 111 formed through the first layer 110 may have a diverse cross-section e.g. circular, square, rectangular, diamond-shaped, star-shaped or other. The shape of the through cavity 111 is defined by the shape of the central rod 35, in particular the cross-section thereof.

The dimensions of the tablet and of the cavity of the pierced layer are selected as a function of the desired action and functioning of the tablet. In particular, for a detergent tablet, the shape and dimensions of the layers and cavity are chosen as a function of the desired disintegration sequences and times.

Preferably, the through cavity is defined by a cavity height (hc) to tablet height (ht) ratio of between 5% and 80%, and more preferably of between 10% and 50%.

Preferably, the through cavity is defined by a ratio of cavity surface (Sc) to tablet surface (St) of between 2% and 70%, and more preferably of between 5% and 40%.

For example, for a multilayer tablet of substantially cylindrical shape, with a cavity of circular cross-section, the diameter of the cavity is between 5% and 80% of the diameter of the first tablet layer, and preferably between 10% and 60%.

Aside from the advantages presented above in connection with the specific arrangement of the layers with respect to one another, the proposed compacted multilayer tablet has the particularity of relatively homogeneous percentage compaction throughout the tablet, in particular whether at the cavity or in the tablet as a whole. In addition, the percentage compaction at the through cavity is low in comparison with the cavities obtained with prior art technologies, in particular via stamping or fixed rod. This makes it possible to further improve the disintegration times of the tablets, in particular by eliminating the formation of hard cores.

Preferably, the percentage compaction of the compacted powder at the through cavity is close to the percentage compaction of the whole multilayer tablet. Preferably, the percentage compaction of the compacted powder at the cavity differs from the percentage compaction of the whole multilayer tablet by less than 5%, more preferably by less than 3%, and further preferably by less than 1%.

Comparative tests were performed as set out below to highlight the advantages imparted to the compacted multilayer tablets by the proposed compaction method using the specifically developed rotary press.

More specifically, the tests allowed a comparison to be made between the tablets formed using different technologies, in particular with a movable upper punch and fixed protruding rod (stamping technique), with a fixed lower punch having a fixed protruding rod, or using the proposed method with a fixed lower punch having a projecting rod mounted on a spring.

Experimental Conditions

The objective is to measure the percentage compaction of the compacted powder contained in the cavity of the tablets and the disintegration time of the tablets. The tablets were therefore obtained using the following technologies:
- fixed upper punch with rod (stamping method);
- fixed lower punch with fixed rod;
- fixed lower punch with spring-mounted rod (method of the invention)

Handlings are performed on a hydraulic press.

The true density of the powder used was measured on a helium pycnometer of Ultrapycnometer 1000 type by Quantachrome using the following protocol:
- the product to be analyzed is weighed in a cell;
- the cell is then placed in the measuring chamber of the pycnometer;
- the measuring chamber is closed and measurement initiated;
- on completion of measurement, the true density of the analyzed product is obtained.

The principle of this measurement is to inject a gas such as helium at a given pressure into a reference chamber, then to expand this gas in the measuring chamber containing the sample and measure the new pressure of the gas in this chamber. This method is particularly adapted for measurement of volumes and densities of divided or porous solids since the gas enters the cavities.

The percentage compaction (T) is defined by the following formula:

$$T=(da/dv)*100$$

where:
da is the apparent density of the compacted solid product,
dv is the true density of the powder before compaction.

Apparent density (da) is determined using the following formula:

$$da=m/V=m/(S*h)$$

where:
m is the mass of the compacted solid product, in grams
V is the volume of the compacted solid product in cm3,
S is the surface area of the compacted solid product in cm2,
h is the height of the compacted solid product in cm, measured using a vernier caliper after ejection of the solid product from the die of the press used for compaction.

The formed tablets have a cylindrical shape with a diameter of 32 mm. The cavity is also of cylindrical shape with a diameter of 10 mm.

For the stamping method, the following elements were used:
a fixed cylindrical lower punch of diameter 32 mm, with planar circular active surface;
a die with cylindrical cavity of diameter 32 mm;
a movable cylindrical upper punch of diameter 32 mm, with planar circular active surface having a fixed projecting rod, the rod having a diameter of 10 mm and projecting from the active surface of the punch by 3.84 mm.

For the method using a fixed lower punch with fixed rod, the following elements were used:
a fixed cylindrical lower punch of diameter 32 mm, with a planar circular active surface having a fixed projecting rod, the rod having a diameter of 10 mm and projecting from the active surface of the punch by 3.84 mm;
a die with cylindrical cavity of diameter 32 mm;
a movable cylindrical upper punch of diameter 32 mm, with a planar circular active surface.

For the method of the invention using a fixed lower punch with a spring mounted rod, the following elements were used:
a fixed cylindrical lower punch of diameter 32 mm, with a planar circular active surface having a movable projecting rod mounted on a spring (spring constant of 1.05 daN/mm and length of 20 mm), the rod having a diameter of 10 mm and projecting beyond the active surface of the punch in deployed position by 5.62 mm;
a die having a cylindrical cavity of diameter 32 mm;
a movable cylindrical upper punch of diameter 32 mm, with a planar circular active surface.

A bilayer tablet was produced in which the composition of the powder mixtures for the two layers was identical. One of two layers weighed 13.5 g and the other of the two layers weighed 4.5 g, i.e. a tablet weighing a total of 18 g. The tests were successively performed for a dishwasher formula, washing machine formula and disinfectant formula.

A pre-compaction force of 5 kN (i.e. a pressure of 6.2 MPa) was applied to the first layer and final compaction of 40 kN (i.e. a pressure of 49.7 MPa) was applied for the dishwasher formula and for the disinfectant formula to compress the two layers of the tablet. A final compaction of 30 kN (i.e. a pressure of 37.3 MPa) was applied for the laundry formula.

Tests Performed on a Dishwasher Detergent Powder

The dishwasher detergent powder used was composed of the ingredients detailed in following Table 1:

TABLE 1

| Ingredient | Amount (wt. %) |
|---|---|
| Dense sodium carbonate | 34.3 |
| Polycarboxylate | 3.65 |
| Sodium silicate | 10.06 |
| Non-ionic surfactant | 2.94 |
| Sodium chloride | 9 |
| Trisodium citrate dihydrate | 24.08 |
| Sodium sulfate | 7.94 |
| Cellulose | 1.8 |
| PEG 1500 | 5.62 |
| Magnesium stearate | 0.05 |
| Glycerine | 0.56 |
| TOTAL | 100.00 |

The true density of this detergent powder measured as described previously on the helium pycnometer was 2.0171 g/cm3.

The measurements of percentage compaction of the compacted powder contained in the cavity of the tablets, and the disintegration times of the tablets obtained with the three previously described technologies are given in Table 2 below.

The disintegration time of the tablets obtained was measured on raising and lowering equipment with a frequency of 60 strokes/min. The tablets were placed in a basket having multiple holes for passing of water. The baskets were immersed in beakers containing 1.8 L of water at 30° C. The disintegration time was recorded once the tablet had completely disintegrated and there were no tablet residues left in the basket.

TABLE 2

| Technology used | Percentage compaction of the compacted powder at the tablet cavity (%) | Percentage compaction of the tablet (%) | Tablet disintegration (min) |
|---|---|---|---|
| Fixed upper punch with fixed rod (stamping) | 95 | 76 | 8.5 |
| Fixed lower punch with fixed rod | 84 | 77 | 10.5 |
| Lower punch with spring-mounted rod (invention) | 78 | 77 | 7 |

Tests Performed on a Laundry Detergent Powder

The laundry detergent powder used was composed of the ingredients detailed in following Table 3:

TABLE 3

| Ingredient | Amount (wt. %) |
|---|---|
| Sodium silicate + sodium carbonate mixture | 16.5 |
| Soap 80:20 Palm/Coconut | 0.76 |
| Non-ionic surfactant + zeolite | 3.995 |
| Modified zeolite | 3.995 |

TABLE 3-continued

| Ingredient | Amount (wt. %) |
|---|---|
| Anionic surfactant | 8.96 |
| Microcrystalline cellulose | 1.45 |
| Sodium percarbonate | 36.86 |
| Sodium silicate | 1.96 |
| Trisodium citrate dihydrate | 22.49 |
| Optical brightener | 1.69 |
| Optical brightener | 0.11 |
| Sodium hedphosphonate | 1.12 |
| Magnesium stearate | 0.11 |
| TOTAL | 100.00 |

The true density of this detergent powder measured as described previously was 1.7508 g/cm3.

Measurements of percentage compaction of the compacted powder contained in the cavity of the tablets, and the disintegration times of the tablets obtained with the three previously described technologies are given in Table 4 below.

The disintegration time of the tablets obtained was measured statically in a 1 L beaker of water at 20° C. The disintegration time was recorded once the tablet had fully disintegrated.

TABLEAU 4

| Technology used | Percentage compaction of the compacted powder at the tablet cavity (%) | Percentage compaction of the tablet (%) | Tablet disintegration (min) |
|---|---|---|---|
| Fixed upper punch with fixed rod (stamping) | 91 | 79 | >10 |
| Fixed lower punch with fixed rod | 86 | 79 | >10 |
| Lower punch with spring-mounted rod (invention) | 83 | 79 | 1.1 |

Tests Performed on a Disinfectant Formula

The disinfectant powder used was composed of the ingredients detailed in following Table 5:

TABLE 5

| Ingredient | Amount (wt. %) |
|---|---|
| Sodium dichloroisocyanurate dihydrate | 80.77 |
| Sodium bicarbonate | 11.54 |
| Adipic acid | 7.69 |
| TOTAL | 100.00 |

The true density of this disinfectant powder measured as described previously was 1.8641 g/cm3.

Measurements of percentage compaction of the compacted powder contained in the cavity of the tablets, and the disintegration times of the tablets obtained with the three previously described technologies are given in Table 6 below.

The disintegration time of the tablets obtained was measured statically in a 1 L beaker of water at 20° C. The disintegration time was recorded once the tablet had fully disintegrated.

TABLE 6

| Technology used | Percentage compaction of the compacted powder at the cavity of the tablets (%) | Percentage compaction of the tablet (%) | Tablet disintegration (min) |
|---|---|---|---|
| Fixed upper punch with fixed rod (stamping) | 93 | 78 | 8 |
| Fixed lower punch with fixed rod | 85 | 81 | 8.75 |
| Lower punch with spring-mounted rod (invention) | 76 | 78 | 5 |

All the tests presented above show that the multilayer tablets formed with the proposed method have very homogeneous percentage compaction within the tablet, in particular between the percentage compaction of the compacted powder at the cavity and the percentage compaction of the whole multilayer tablet.

On the contrary, it is ascertained that the tablets formed with the prior art methods have percentage compactions which vary substantially with respect to tablet area.

Also, the described tests show that the proposed tablets have improved disintegration properties since the disintegration time is strongly reduced.

Additionally, the above conclusions are valid irrespective of the composition forming the tablet, this being most advantageous.

BIBLIOGRAPHIC REFERENCES

EP0979862
WO01/98448
WO01/49815
EP1179042
EP1244767
WO2006/048606
WO00/10800
WO01/85437
EP1440790

The invention claimed is:

1. A method of producing a compacted tablet having at least two layers using a rotary press device, comprising the following successive steps:
  E1. Taking a first mixture in powder form and placing said first mixture in an open space formed by a lower punch and a die arranged in a rotary table, so as to cover an active surface of said lower punch and a central rod projecting from said active surface, said central rod being mounted within a longitudinal cavity of the lower punch movable in translation with respect to said lower punch, wherein the central rod is coupled to the lower punch via a resilient link provided along the translation axis of the central rod to hold, in a rest position, the central rod in a deployed position in which the central rod projects with respect to the active surface of the lower punch;
  E2. Moving an upper punch close to the lower punch so as to apply a compaction stress on the first mixture to form a first compacted layer, said compaction stress further allowing movement of the central rod towards inside the longitudinal cavity;
  E3. Moving the upper punch away from the lower punch so as to remove the compaction stress on the first mixture so that the central rod returns to said deployed position with respect to the lower punch, the central rod thereby piercing the first layer so as to form a through cavity;

E4. Taking a second mixture in powder form and placing said second mixture in the open space formed by the lower punch and the die, so as to cover the first layer;

E5. Moving the upper punch close to the lower punch so as to apply a compaction stress on the second mixture and the first layer to form a second compacted layer on the first layer;

E6. Moving the upper punch away from the lower punch so as to remove the compaction stress on the compacted assembly formed by the first and second layers;

E7. Ejecting the compacted assembly out of the die by translation of the lower punch so that the active surface of said lower punch lies flush with the surface of the rotary table, the compacted assembly thus ejected forming the compacted tablet.

2. The method of claim 1 wherein, at the ejection step E7, the movement of the lower punch in the direction of the die allows movement of the central rod to a retracted position in which the central rod does not project from the active surface of the lower punch.

3. The method of claim 1, wherein before the ejection step E7, the successive steps E4, E5 and E6 are reiterated as many times as it is desired to add additional layers to the compacted assembly.

4. The method of claim 1 wherein, before the ejection step E7, an additional compacting step is performed by moving the upper punch close to the lower punch so as to apply an additional compaction stress to the compacted assembly.

5. The method of claim 1 to produce a compacted multilayer tablet
wherein the first layer includes a through cavity along a longitudinal axis orthogonal to the first layer so as to form a pierced layer; and
at least one second layer directly formed on the first layer; wherein the first layer is the only pierced layer of the tablet and the second layer fills less than 70% of the volume of the cavity of the first layer.

6. The method of claim 5 to produce a compacted multilayer tablet, wherein the second layer has a surface flush with the surface of the first layer without the second layer extending into the cavity of the first layer.

7. The method of claim 5 to produce a compacted multilayer tablet, in which the percentage compaction of the mixture of compacted powder at the cavity differs from the percentage compaction of the whole multilayer tablet by less than 5%.

8. The method of claim 5 to produce a compacted multilayer tablet, in which the percentage compaction of the mixture of compacted powder at the cavity differs from the percentage compaction of the whole multilayer tablet by less than 3%.

9. The method of claim 5 to produce a compacted multilayer tablet, in which the percentage compaction of the mixture of compacted powder at the cavity differs from the percentage compaction of the whole multilayer tablet by less than 1%.

10. The method of claim 5 to produce a compacted multilayer tablet, wherein the different layers are formed from powder mixtures for detergent or disinfectant action.

* * * * *